US011969815B2

(12) United States Patent
Kuo et al.

(10) Patent No.: US 11,969,815 B2
(45) Date of Patent: Apr. 30, 2024

(54) AUTOMATIC MATERIAL CHANGING AND WELDING SYSTEM AND METHOD FOR STAMPING MATERIALS

(71) Applicant: National Kaohsiung University of Science and Technology, Kaohsiung (TW)

(72) Inventors: Chun-Chih Kuo, Kaohsiung (TW); Hao-Lun Huang, Kaohsiung (TW); Bor-Tsuen Lin, Kaohsiung (TW); Cheng-Yu Yang, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 73 days.

(21) Appl. No.: 17/563,445

(22) Filed: Dec. 28, 2021

(65) Prior Publication Data
US 2023/0201951 A1   Jun. 29, 2023

(51) Int. Cl.
*B23K 11/36* (2006.01)

(52) U.S. Cl.
CPC .................................. *B23K 11/36* (2013.01)

(58) Field of Classification Search
CPC ..... B23K 11/36; B23K 11/366; B23K 11/002; B23K 11/115
USPC .................................................... 219/121.64
See application file for complete search history.

(56) References Cited

U.S. PATENT DOCUMENTS 7,309,845 B2 * 12/2007 Domschot .............. B23K 11/36
219/158

OTHER PUBLICATIONS

CN-111889867-B, Machine translation, Double-station Automatic Resistance Welding Device, Inventors: Wu, Jian-bin, Lin, Zhi-hui, Zhang, Wei (Year: 2021).*
CN 112828436 A, Machine translation, Cutting System for Continuous Automatic Discharging Automatic Resistance Welding Device, Inventors: Men, Song-mingzhu, Wei, Jing, Zhou, Ai-he (Year: 2021).*

* cited by examiner

*Primary Examiner* — Dana Ross
*Assistant Examiner* — James F Sims, III
(74) *Attorney, Agent, or Firm* — WPAT, PC

(57) ABSTRACT

An automatic material changing and welding system for stamping materials includes a welding transfer sliding table and a welding platform. The automatic material changing device further includes a feeding system. The feeding system includes a double-head uncoiling machine, an automatic feeding machine and a flattening machine. The automatic material changing device is used for automatic feeding for a stamping machine. The system triggers a material changing signal through a sensor to control and integrate the welding transfer sliding table and the welding platform to act to execute a welding procedure, so that the stamping materials are in welding connection with new and old coiled materials through a welding connection plate to realize continuous production operation of an automated stamping production line.

9 Claims, 7 Drawing Sheets

AUTOMATIC MATERIAL CHANGING AND WELDING SYSTEM AND METHOD FOR STAMPING MATERIALS

BACKGROUND

Technical Field

The present invention relates to an automatic material changing and welding system and method for stamping materials, and particularly relates to an automatic material changing and welding system and method for stamping materials, suitable for an automatic material changing device and capable of realizing continuous production through welding connection of new and old coiled materials.

Related Art

Molds are the basic manufacturing equipment for mass production in industry, known as the "mother of industry". The application range of molds is very wide, involving machinery, automobiles, aerospace, electronics, chemical industry, metallurgy, building materials, etc. With the rapid development of the science and technology, the global industry is moving towards the direction of intelligence, such as artificial intelligence, machine learning, the Internet of things and virtual and real integration. As a result, production lines begin to change from early single product and labor-intensive production lines to diversified and unmanned production lines, and similarly, the mold industry must conform to such production characteristics. Therefore, intelligent molds are born accordingly. In addition to the mold industry, related manufacturing industries are also developing towards automation and intelligence.

An automated stamping production line is a large and complex system including a plurality of highly automated devices and a plurality of links. In order to fully exert the maximum production capacity, reasonable planning and layout of the automatic production line are required in a design process. However, one of the key factors that the current automated stamping production line cannot achieve unmanned stamping is that after the production of a coiled material is finished, a machine needs to be shut down and the material needs to be changed manually, and after the material is changed, feeding and mold adjustment production are restarted. Therefore, how to change the material quickly and avoid manual material change to strengthen the advantages of the automated stamping production line is a major problem to be solved urgently.

SUMMARY

An objective of the present invention is to provide an automatic material changing and welding system and method for stamping materials, applied to an automatic material changing device of an automated stamping production line. When it is found that an old coiled material is about to be used up by sensing, new and old coiled materials are in welding connection through a welding gun, so as to realize continuous production operation of the automated stamping production line.

To achieve the above objective, the present invention provides an automatic material changing and welding system for stamping materials, suitable for an automatic material changing device. The automatic material changing device further comprises a feeding system. The feeding system comprises a double-head uncoiling machine, an automatic feeding machine and a flattening machine. The automatic material changing device is used for automatic feeding for a stamping machine. The automatic material changing and welding system for stamping materials comprises: a welding transfer sliding table, comprising: an electric welding machine used for executing a welding procedure; a driving mechanism arranged on the welding transfer sliding table and used for loading the electric welding machine to move; a limiting block arranged on a linear sliding rail group and used for enabling the electric welding machine to move back and forth in a direction of the linear sliding rail group; a welding platform used for driving a stamping material to move into the stamping machine from a welding feed end through a welding discharge end along a same path, wherein the welding platform further comprises: a proximity switch arranged at the welding feed end and used for sensing the stamping material and generating a material changing signal; two material clamping pneumatic cylinders arranged at the welding discharge end, wherein when the proximity switch does not sense the stamping material, the two material clamping pneumatic cylinders clamp the stamping material; a welding connection plate suction apparatus used for sucking a welding connection plate and placing the welding connection plate above the welding platform; and a control unit electrically connected to the welding transfer sliding table and the welding platform and used for controlling and integrating the welding transfer sliding table and the welding platform to act according to the material changing signal to execute the welding procedure, so that the stamping material is connected through the welding connection plate, so as to execute automatic material changing and welding operations of the stamping material.

In some implementation schemes, the double-head uncoiling machine can load two rolls of stamping materials at the same time, and after production of a first stamping material in a first station is finished, the transfer platform can be moved left and right through the pneumatic cylinders matched with linear sliding rails to replace the first stamping material with a second stamping material in a second station.

In some implementation schemes, the driving mechanism comprises two pneumatic cylinders and a linear sliding rail group driven by the pneumatic cylinders.

In some implementation schemes, the limiting block is made of a polyurethane material.

In some implementation schemes, the electric welding machine is a gun type resistance welding machine.

In some implementation schemes, the gun type resistance welding machine is a resistance welding machine with an adjustable output current and a welding end pressure of 300 kg, and pressure adjustment can be performed through a pressure adjusting valve.

In some embodiments, the welding connection plate suction apparatus further comprises a displacement mechanism, a taking pneumatic cylinder, an adsorption fixed type sucker and a vacuum generator.

In some embodiments, the welding connection plate suction apparatus further comprises a blowing steel pipe.

In some embodiments, the welding connection plate is a stainless steel plate or a steel plate, and a thickness of the welding connection plate is about one fifth of that of the stamping material.

The present invention also provides an automatic material changing and welding method for stamping materials, using the above automatic material changing and welding system for stamping materials, and comprising: driving, by a welding platform, a first stamping material and a second stamping material to move into a stamping machine from a welding feed end through a welding discharge end along a same path; sensing, by a proximity switch arranged at the welding feed end, the first stamping material, and when the proximity switch does not sense the first stamping material, generating a material changing signal; controlling, by a control unit, the welding platform according to the material changing signal to enable a tail end of the first stamping material to stop above the welding platform between the welding feed end and the welding discharge end, and enable the automatic feeding machine to drive a front end of the second stamping material to stop above the welding platform, wherein the tail end of the first stamping material and the front end of the second stamping material are adjacent but are not overlapped; when the proximity switch does not sense the first stamping material, clamping and fixing, by two material clamping pneumatic cylinders arranged at the welding discharge end, the first stamping material; sucking, by a welding connection plate suction apparatus, a welding connection plate and placing the welding connection plate above the welding platform; enabling, by a driving mechanism of a welding transfer sliding table, an electric welding machine to execute a welding procedure to connect the welding connection plate, the tail end of the first stamping material and the front end of the second stamping material to each other, thereby completing automatic material changing and welding; and resetting, by the driving mechanism, the electric welding machine after the automatic material changing and welding are completed.

The automatic material changing and welding system and method for stamping materials in the present invention at least have the following characteristics: the use condition of the stamping material is judged in real time through the proximity switch; old and new coiled materials are connected in a welding mode of the welding connection plate instead of directly welding new and old materials, thereby effectively avoiding the unevenness of the stamping material due to welding beads, which causes defects in a stamping production process; and a tail end of an old coiled material is welded with a head end of a new coiled material to avoid the reduction of production efficiency due to the shutdown and material change during continuous production, thereby achieving an automated stamping production line with the highest efficiency.

DETAILED DESCRIPTION

Figure 1:
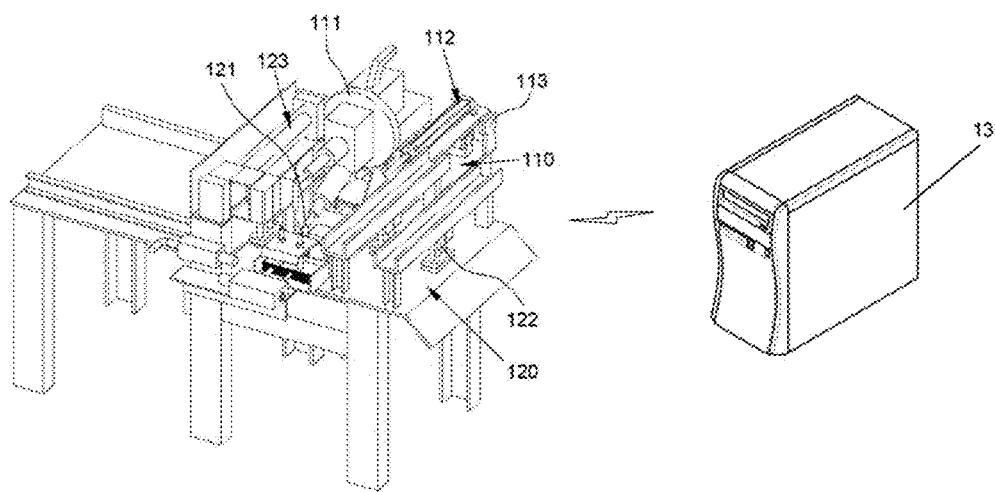
FIG. 1 is a schematic diagram of an automatic material changing and welding system for stamping materials in an embodiment of the present invention.

Embodiments of the present invention are described in detail below with reference to the accompanying drawings, the accompanying drawings are mainly simplified schematic diagrams, and only exemplify the basic structure of the present invention schematically. Therefore, only the components related to the present invention are shown in the drawings, and are not drawn according to the quantity, shape, and size of the components during actual implementation. During actual implementation, the type, quantity, and proportion of the components may be changed, and the layout of the components may be more complicated.

The following description of various embodiments is provided to exemplify the specific embodiments of the present invention with reference to accompanying drawings. The directional terms mentioned in the present invention, for example, "upper", "lower", "before", "after", "left", "right", "inside", "outside", and "side", are only references to the directions in the drawings. Therefore, the used direction terms are intended to describe and understand this application, but are not intended to limit this application. In addition, in the specification, unless explicitly described as contrary, the word "include" is understood as referring to including the element, but does not exclude any other elements.

FIG. 1 is a schematic diagram of an automatic material changing and welding system for stamping materials in an embodiment of the present invention. As shown in FIG. 1, the automatic material changing and welding system for stamping materials includes: a welding transfer sliding table 110, including: an electric welding machine 111 used for executing a welding procedure; a driving mechanism 112 arranged on the welding transfer sliding table 110 and used for loading the electric welding machine 111 to move; a limiting block 113 arranged on a linear sliding rail group and used for enabling the electric welding machine 111 to move back and forth in a direction of the linear sliding rail group; a welding platform 120 used for driving a stamping material to move into the stamping machine from a welding feed end through a welding discharge end along a same path, wherein the welding platform 120 further includes: a proximity switch 121 arranged at the welding feed end and used for sensing the stamping material and generating a material changing signal; two material clamping pneumatic cylinders 122 arranged at the welding discharge end, wherein when the proximity switch 121 does not sense the stamping material, the two material clamping pneumatic cylinders 122 clamp the stamping material; a welding connection plate suction apparatus 123 used for sucking a welding connection plate and placing the welding connection plate above the welding platform 120; and a control unit (not shown in the figure) electrically connected to the welding transfer sliding table 110 and the welding platform 120 and used for controlling and integrating the welding transfer sliding table 110 and the welding platform 120 to act according to the material changing signal to execute the welding procedure, so that the stamping material is connected through the welding connection plate, so as to execute the automatic material changing and welding operations of the stamping material.

The automatic material changing and welding system for stamping materials in this embodiment is suitable for an automatic material changing device. The automatic material changing device further includes a feeding system. The feeding system includes a double-head uncoiling machine, an automatic feeding machine and a flattening machine. The automatic material changing device is used for automatic feeding for a stamping machine.

In some embodiments of the present invention, the double-head uncoiling machine can load two rolls of stamping materials at the same time. After production of a first stamping material in a first station is finished, the transfer platform can be moved left and right through the pneumatic cylinders matched with linear sliding rails to replace the first stamping material with a second stamping material in a second station.

In some embodiments of the present invention, a driving mechanism of the welding transfer sliding table includes two pneumatic cylinders and a linear sliding rail group driven by the pneumatic cylinders, and is used for enabling the electric welding machine to move in X-axis and Y-axis directions above the welding transfer sliding table. The reciprocating direction of the electric welding machine is limited through the limiting block.

The limiting block is made of a polyurethane material.

In some embodiments of the present invention, the electric welding machine is a gun type resistance welding machine.

The gun type resistance welding machine is a resistance welding machine with an adjustable output current and a welding end pressure of 300 kg. Pressure adjustment can be performed through a pressure adjusting valve.

In some embodiments, a rated power of the electric welding machine with a 50% utilization rate is 32 KVA.

In some embodiments, a secondary no-load voltage of the electric welding machine is 5.6 V.

In some embodiments, a two-time continuous current of the electric welding machine is 4 KA.

In some embodiments, a specification of a power wire used by the electric welding machine is 14 mm$^2$.

In some embodiments, a maximum welding capacity (mild steel plate) of the electric welding machine is 3.5 mm.

In some embodiments, a maximum stroke of a welding end of the electric welding machine is 60 mm.

In some embodiments, an operating throat width of the electric welding machine is 110 mm.

In some embodiments, an adjustable stroke of a throat opening of the electric welding machine is 0-20 mm.

In some embodiments, a maximum throat opening of the electric welding machine is 60 mm.

In some embodiments, a welding end pressure of the electric welding machine is 300 kg.

In some embodiments of the present invention, the welding connection plate suction apparatus further includes a displacement mechanism, a taking pneumatic cylinder, an adsorption fixed type sucker and a vacuum generator.

The welding connection plate suction apparatus further includes a blowing steel pipe.

In some embodiments, the welding connection plate is a stainless steel plate or a steel plate, and a thickness of the welding connection plate is about one fifth of that of the stamping material.

Figure 2:
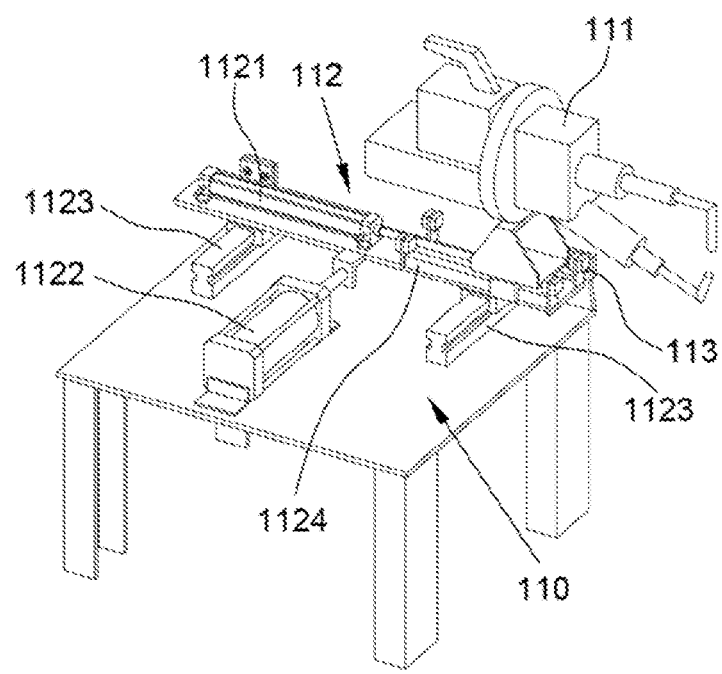
FIG. 2 is a schematic diagram of a welding transfer sliding table of an automatic material changing and welding system for stamping materials in an embodiment of the present invention.

FIG. 2 is a schematic diagram of a welding transfer sliding table of an automatic material changing and welding system for stamping materials in an embodiment of the present invention. As shown in FIG. 2, a welding transfer sliding table 110 includes: an electric welding machine 111 used for executing a welding procedure; a driving mechanism 112 arranged on the welding transfer sliding table 110 and used for loading the electric welding machine 111 to move; and a limiting block 113 arranged on a linear sliding rail group and used for enabling the electric welding machine 111 to move back and forth in a direction of the linear sliding rail group.

In some embodiments of the present invention, the driving mechanism 112 of the welding transfer sliding table 110 includes two groups of pneumatic cylinders 1121 and 1122, a linear sliding rail group driven by the pneumatic cylinders 1121 and 1122, and a sliding seat including the electric welding machine 111. The linear sliding rail group further includes an X-axis linear sliding rail 1123 for enabling the electric welding machine 111 to move in an X-axis direction above the welding transfer sliding table, and a Y-axis linear sliding rail 1124 for enabling the electric welding machine to move in a Y-axis direction above the welding transfer sliding table.

Figure 3:
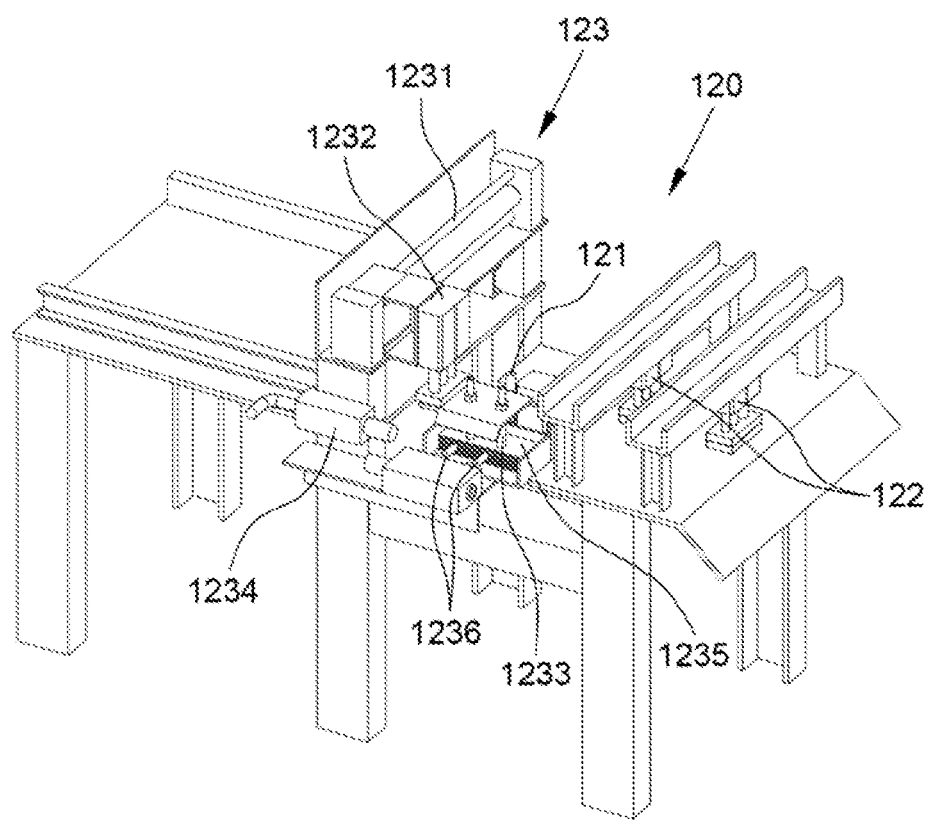
FIG. 3 is a schematic diagram of a welding platform of an automatic material changing and welding system for stamping materials in an embodiment of the present invention.

FIG. 3 is a schematic diagram of a welding platform of an automatic material changing and welding system for stamping materials in an embodiment of the present invention. As shown in FIG. 3, a welding platform 120 is used for driving a stamping material to move into the stamping machine from a welding feed end through a welding discharge end along a same path. The welding platform 120 further includes: a proximity switch 121 arranged at the welding feed end and used for sensing the stamping material and generating a material changing signal; two material clamping pneumatic cylinders 122 arranged at the welding discharge end, wherein when the proximity switch 121 does not sense the stamping material, the two material clamping pneumatic cylinders 122 clamp the stamping material; and a welding connection plate suction apparatus 123 used for sucking a welding connection plate and placing the welding connection plate above the welding platform 120.

In some embodiments of the present invention, the welding connection plate suction apparatus 123 further includes a displacement mechanism 1231, a taking pneumatic cylinder 1232, an adsorption fixed type sucker 1233 and a vacuum generator 1234.

When the proximity switch 121 does not sense the stamping material, a material changing signal is generated. When the stamping materials are crossed above the welding platform 120 through the control unit, the adsorption fixed type sucker 1233 is moved through the displacement mechanism 1231 to suck the welding connection plate 1235 by vacuum, and then, the welding connection plate 1235 is placed above the welding platform 120.

The taking pneumatic cylinder 1232 is used for providing the power required by a moving direction of the displacement mechanism 1231. The vacuum generator 1234 enables the adsorption fixed type sucker 1233 to generate a vacuum and suck the welding connection plate 1235.

The welding connection plate suction apparatus 123 further includes a blowing steel pipe 1236. Air is blown to the place where the welding connection plates 1235 are placed through the blowing steel pipe 1236 to generate a buoyancy between the overlapped welding connection plates 1235, so that the adsorption fixed type sucker 1233 sucks a single piece of the welding connection plate 1235.

Figure 4:
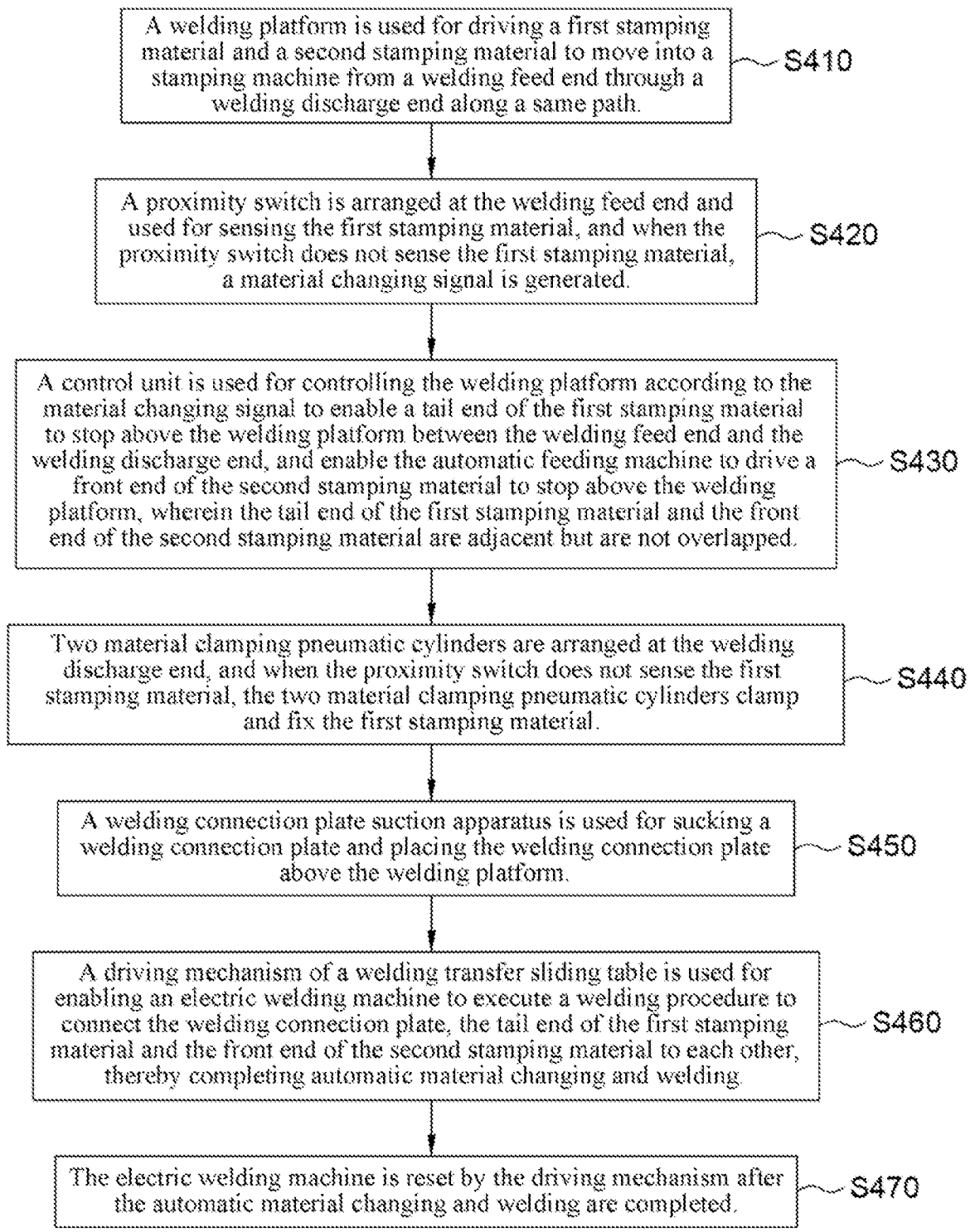
FIG. 4 is a step process diagram of an automatic material changing and welding method for stamping materials in an embodiment of the present invention.
Figure 5A:
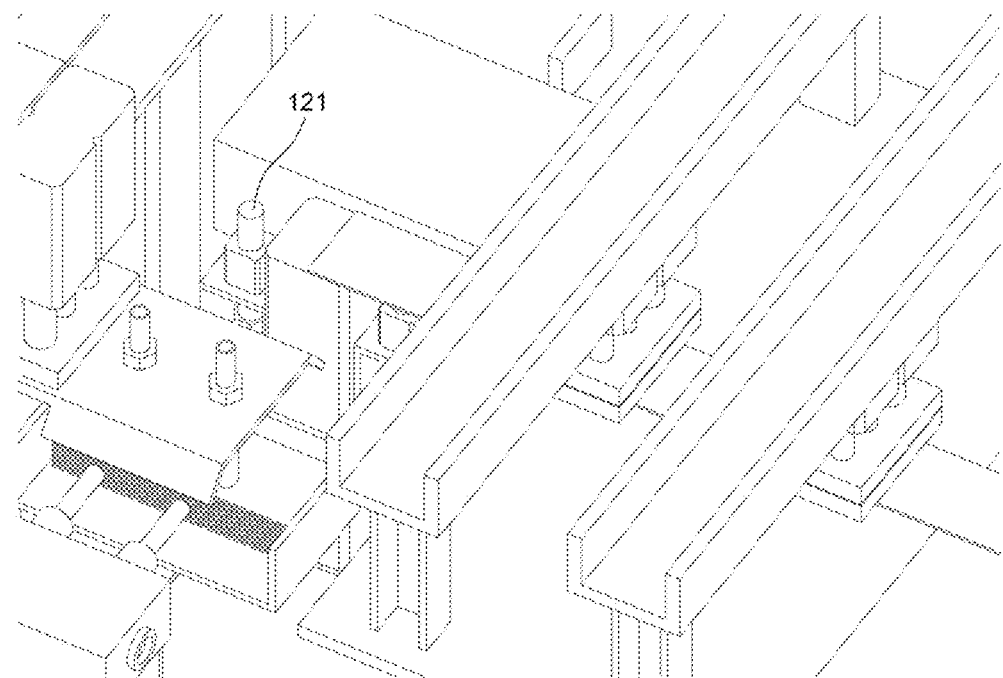
FIGS. 5A-5F are a schematic welding process diagram of an automatic material changing and welding system for stamping materials in an embodiment of the present invention.
Figure 5B:
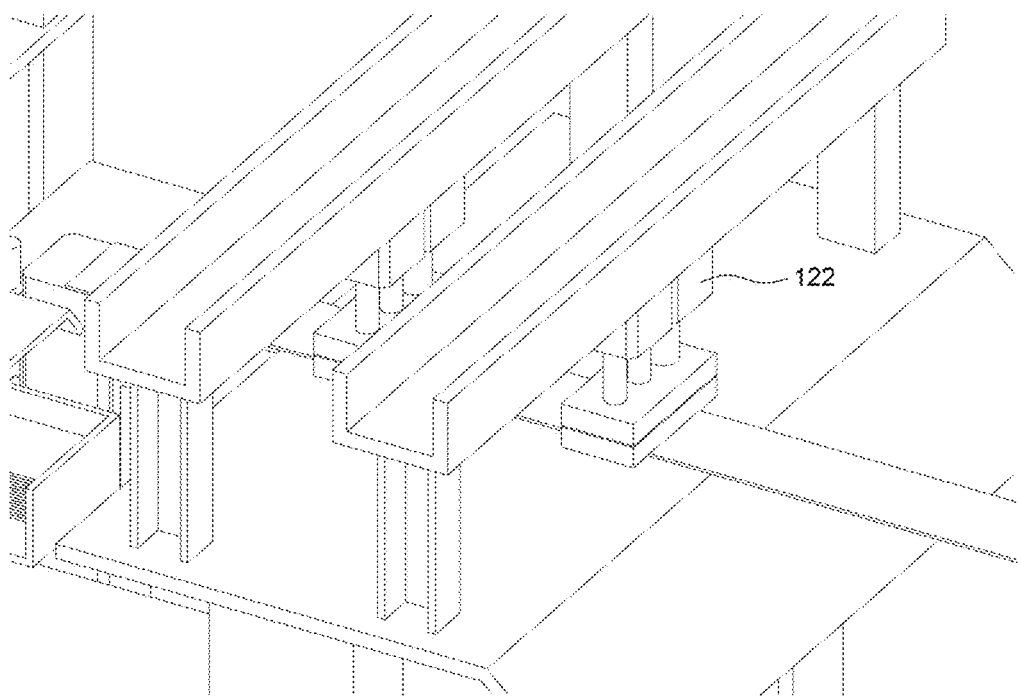
Figure 5C:
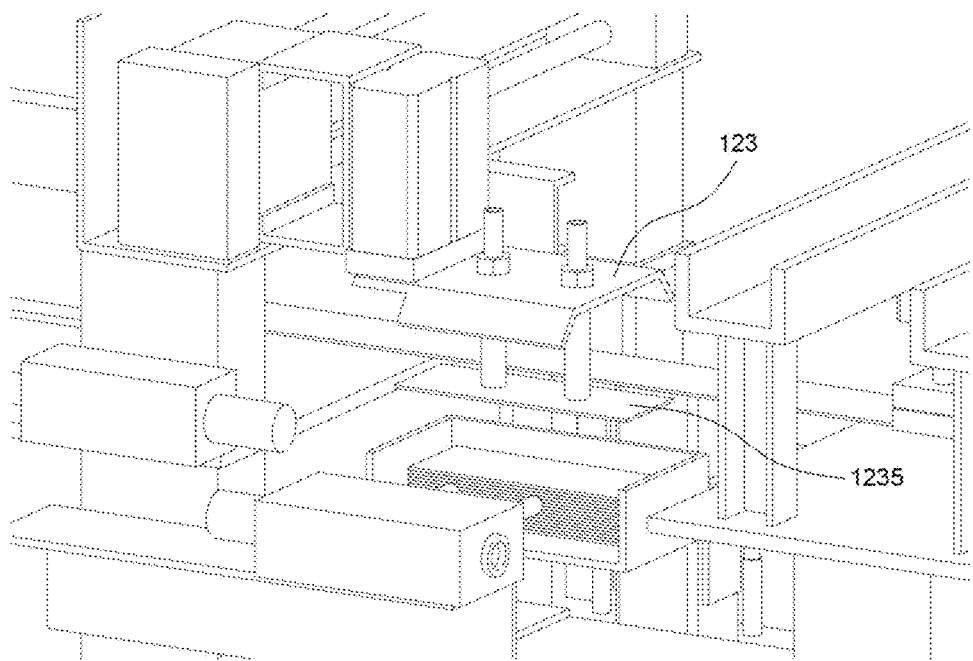
Figure 5D:
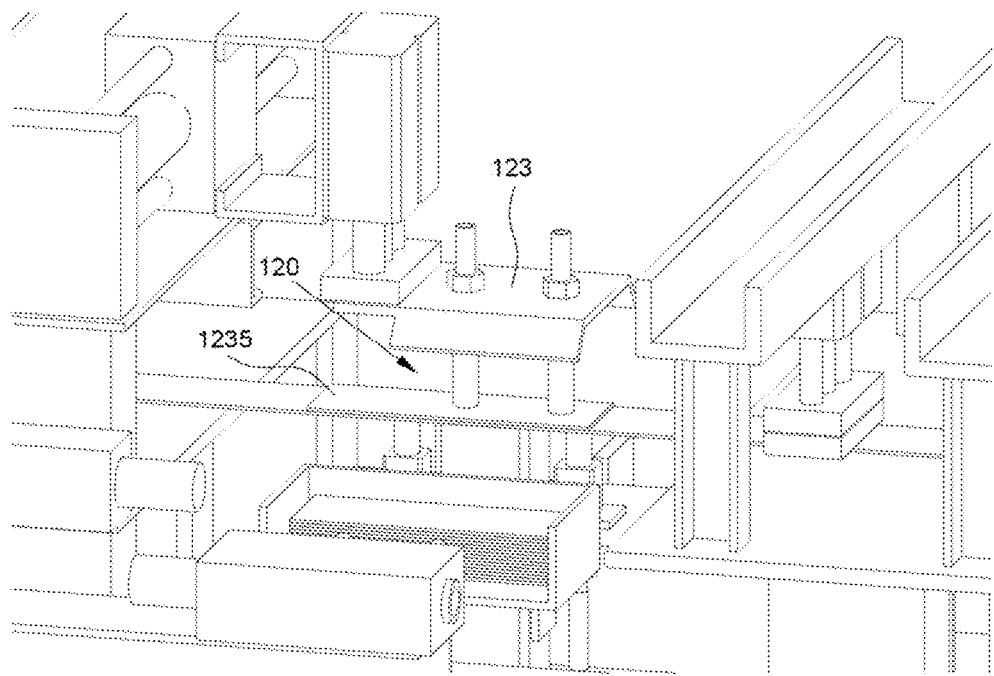
Figure 5E:
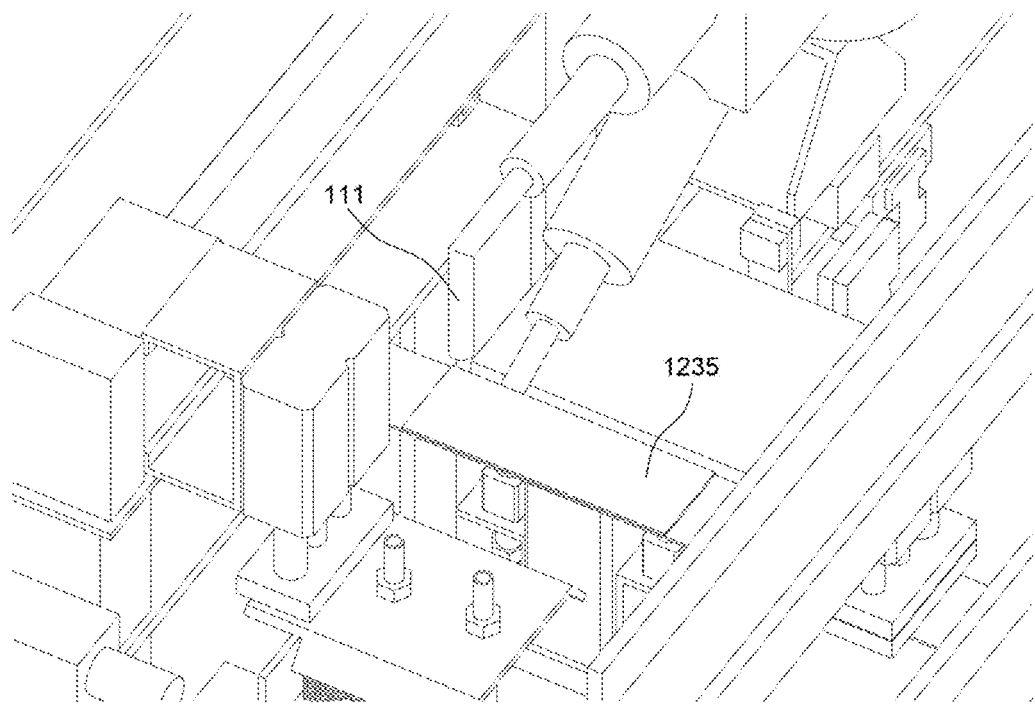
Figure 5F:
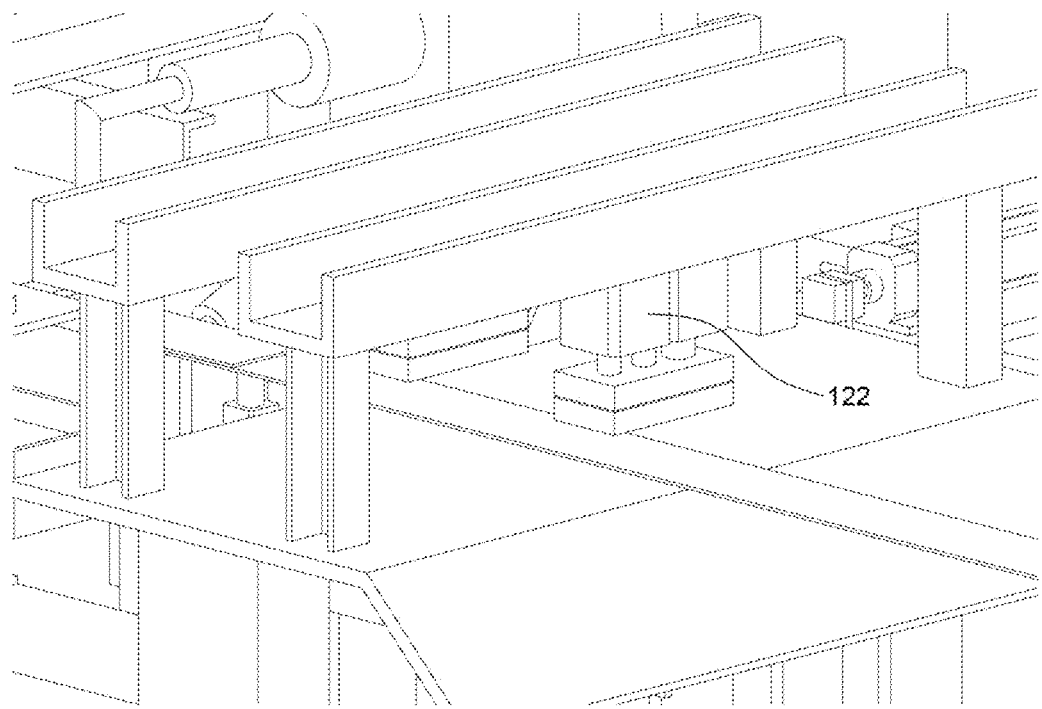

FIG. 4 is a step process diagram of an automatic material changing and welding method for stamping materials in an embodiment of the present invention. The step processes are as follows:

S410: A welding platform is used for driving a first stamping material and a second stamping material to move into a stamping machine from a welding feed end through a welding discharge end along a same path.

S420: A proximity switch is arranged at the welding feed end and used for sensing the first stamping material, and when the proximity switch does not sense the first stamping material, a material changing signal is generated.

S430: A control unit is used for controlling the welding platform according to the material changing signal to enable a tail end of the first stamping material to stop above the welding platform between the welding feed end and the welding discharge end, and enable the automatic feeding machine to drive a front end of the second stamping material to stop above the welding platform, wherein the tail end of the first stamping material and the front end of the second stamping material are adjacent but are not overlapped.

S440: Two material clamping pneumatic cylinders are arranged at the welding discharge end, and when the proximity switch does not sense the first stamping material, the two material clamping pneumatic cylinders clamp and fix the first stamping material.

S450: A welding connection plate suction apparatus is used for sucking a welding connection plate and placing the welding connection plate above the welding platform.

S460: A driving mechanism of a welding transfer sliding table is used for enabling an electric welding machine to execute a welding procedure to connect the welding connection plate, the tail end of the first stamping material and the front end of the second stamping material to each other, thereby completing automatic material changing and welding.

S470: The electric welding machine is reset by the driving mechanism after the automatic material changing and welding are completed.

FIGS. 5A-5F are a schematic welding process diagram of an automatic material changing and welding system for stamping materials in an embodiment of the present invention. As shown in FIGS. 5A-5F, when the proximity switch 121 does not sense the stamping material, the tail end of the stamping material is clamped by the material clamping pneumatic cylinders 122, the material is changed by a double-head uncoiling machine, a new stamping material is delivered to the welding platform 120, and the welding connection plate 1235 is sucked through the welding connection plate suction apparatus 123 and moved to the place above the welding platform 120, so that the electric welding machine 111 is in welding connection with new and old stamping materials through the welding connection plate 1235. After the welding is completed, the material clamping pneumatic cylinders 122 are released to ensure normal production of the stamping machine.

The above embodiments merely exemplify the principles, features, and effects of the present invention, but are not intended to limit the implementation scope of the present invention. A person skilled in the art can modify or change the above embodiments without departing from the spirit and scope of the present invention. Any equivalent change or modification made using the contents disclosed by the present invention shall fall within the scope of the claims below.

What is claimed is:

1. An automatic material changing and welding system for stamping materials, suitable for an automatic material changing device, wherein the automatic material changing device comprises a feeding system, the feeding system comprises a double-head uncoiling machine, an automatic feeding machine and a flattening machine, the automatic material changing device is used for automatic feeding for a stamping machine, and the automatic material changing and welding system for stamping materials comprises:
   a welding transfer sliding table, comprising:
     an electric welding machine used for executing a welding procedure;
     a driving mechanism arranged on the welding transfer sliding table and used for loading the electric welding machine to move;
     a limiting block arranged on a linear sliding rail group and used for enabling the electric welding machine to move back and forth in a direction of the linear sliding rail group;
   a welding platform used for driving a stamping material to move into the stamping machine from a welding feed end through a welding discharge end along a same path, wherein the welding platform further comprises:
     a proximity switch arranged at the welding feed end and used for sensing the stamping material and generating a material changing signal;
     two material clamping pneumatic cylinders arranged at the welding discharge end, wherein when the proximity switch does not sense the stamping material, the two material clamping pneumatic cylinders clamp the stamping material;
     a welding connection plate suction apparatus used for sucking a welding connection plate and placing the welding connection plate above the welding platform; and
   a control unit electrically connected to the welding transfer sliding table and the welding platform and used for controlling and integrating the welding transfer sliding table and the welding platform to act according to the material changing signal to execute the welding procedure, so that the stamping material is connected through the welding connection plate, so as to execute automatic material changing and welding operations of the stamping material;
   wherein the driving mechanism of a welding transfer sliding table is used for enabling an electric welding machine to execute a welding procedure to connect the welding connection plate, the tail end of the stamping material and the front end of another stamping material to each other, thereby completing automatic material changing and welding.

2. The automatic material changing and welding system for stamping materials according to claim 1, wherein the driving mechanism comprises two pneumatic cylinders and a linear sliding rail group driven by the pneumatic cylinders.

3. The automatic material changing and welding system for stamping materials according to claim 1, wherein the limiting block is made of a polyurethane material.

4. The automatic material changing and welding system for stamping materials according to claim 1, wherein the electric welding machine is a gun type resistance welding machine.

5. The automatic material changing and welding system for stamping materials according to claim 4, wherein the gun type resistance welding machine is a resistance welding machine with an adjustable output current and a welding end pressure of 300 kg, and pressure adjustment can be performed through a pressure adjusting valve.

6. The automatic material changing and welding system for stamping materials according to claim 1, wherein the welding connection plate suction apparatus further comprises a displacement mechanism, a taking pneumatic cylinder, an adsorption fixed type sucker and a vacuum generator.

7. The automatic material changing and welding system for stamping materials according to claim 1, wherein the welding connection plate suction apparatus further comprises a blowing steel pipe.

8. The automatic material changing and welding system for stamping materials according to claim 1, wherein the welding connection plate is a stainless steel plate or a steel plate, and a thickness of the welding connection plate is one fifth of that of the stamping material.

9. An automatic material changing and welding method for stamping materials, using the automatic material changing and welding system for stamping materials according to claim 1, and comprising:

driving, by a welding platform, a first stamping material and a second stamping material to move into a stamping machine from a welding feed end through a welding discharge end along a same path;

sensing, by a proximity switch arranged at the welding feed end, the first stamping material, and when the proximity switch does not sense the first stamping material, generating a material changing signal;

controlling, by a control unit, the welding platform according to the material changing signal to enable a tail end of the first stamping material to stop above the welding platform between the welding feed end and the welding discharge end, and enable the automatic feeding machine to drive a front end of the second stamping material to stop above the welding platform, wherein the tail end of the first stamping material and the front end of the second stamping material are adjacent but are not overlapped;

when the proximity switch does not sense the first stamping material, clamping and fixing, by two material clamping pneumatic cylinders arranged at the welding discharge end, the first stamping material;

sucking, by a welding connection plate suction apparatus, a welding connection plate and placing the welding connection plate above the welding platform;

enabling, by a driving mechanism of a welding transfer sliding table, an electric welding machine to execute a welding procedure to connect the welding connection plate, the tail end of the first stamping material and the front end of the second stamping material to each other, thereby completing automatic material changing and welding; and resetting, by the driving mechanism, the electric welding machine after the automatic material changing and welding is completed.

* * * * *